United States Patent
Hope et al.

[11] 3,934,354
[45] Jan. 27, 1976

[54] DRYING ROLLERS

[76] Inventors: Henry F. Hope, 3192 Huntingdon Road, Huntingdon Valley, Pa. 19006; Stephen F. Hope, 2548 Wyandotte Road, Willow Grove, Pa. 19090

[22] Filed: Dec. 17, 1973

[21] Appl. No.: 425,075

[52] U.S. Cl. .............................. 34/9; 34/71; 34/95; 34/155; 355/10
[51] Int. Cl.² ............................................ F26B 3/00
[58] Field of Search ............................ 34/9, 69–71, 34/80, 95, 108, 109, 155, 156, 159; 260/31.6; 29/125, 120, 132; 95/94 R; 162/358, 359; 100/176, 155, 160, 162; 355/10

[56] References Cited
UNITED STATES PATENTS

| | | | |
|---|---|---|---|
| 2,240,315 | 4/1941 | Rhodes et al. | 34/71 |
| 2,534,205 | 12/1950 | Newhall et al. | 34/95 |
| 2,777,824 | 1/1957 | Leeds | 260/31.6 |
| 3,133,340 | 5/1964 | Finelli | 29/132 |
| 3,296,710 | 1/1967 | Krikorian | 34/95 |
| 3,617,445 | 11/1971 | Brafford | 162/358 |
| 3,689,147 | 9/1972 | Suzuki | 34/70 |
| 3,707,752 | 1/1973 | Brafford | 29/132 |
| 3,800,366 | 4/1974 | Hill | 29/132 |

*Primary Examiner*—Kenneth W. Sprague
*Assistant Examiner*—James C. Yeung
*Attorney, Agent, or Firm*—Weiser, Stapler & Spivak

[57] ABSTRACT

Drying rollers for use in the dryer section of an automatic X-ray or other film developing machine which incorporates a pair of tangentially contacting, thermoplastic, micro-porous rollers which form a nip therebetween to receive the developed film from the wash tank. The rollers serve to dry the film surface by absorbing the moisture into the roller pores by capillary action. The usual dryer section heater continuously dries the rollers as they are rotated in the dryer section when the film travels through the developing apparatus.

13 Claims, 3 Drawing Figures

DRYING ROLLERS

BACKGROUND OF THE INVENTION

The present invention relates generally to the field of photographic developing equipment, and more particularly, is directed to a film drying system designed for use with automatic film developing machinery.

Small, self-contained, automatic X-ray and other film processing machinery has become increasingly more popular in use due to the ability of such equipment to satisfactorily perform, thereby eliminating the large capital expenditures which would otherwise be required to construct extensive dark room facilities. The present invention relates to film drying rollers which position at the delivery end of such self-contained film developing apparatus and which are employed to dry the film in an improved manner. The invention is equally applicable for use with all types of automatic photographic processers such as development equipment suitable for use with x-ray, graphic arts, commercial film, etc. The device is compatible for use in conjunction with presently available self-contained film processing units and greatly improves over all known prior art types of film dryer systems in efficiency, quality, speed of operation and extremely low installation and maintenance cost factors.

The self-contained, automatic film processing equipment of the type contemplated for use with the novel drying rollers of the present invention comprise a plurality of adjacent processing tanks, each of which is provided with a separate rack assembly which includes pluralities of pairs of driving and driven rollers. The rollers contact the film surface to drive the exposed x-ray or other type of film through the various processing tanks which conventionally contain the usual developers, fixers and washers to positively and automatically develop exposed x-ray or other type of film in accordance with well known principles of automatic film developing apparatus.

It is known to employ separate, horizontally juxtaposed rack assemblies for the developer tank, the fixer tank and the wash tank to automatically feed the exposed x-ray or other type of film directly through the tank and between the tanks in an automatic manner. The prior art rack assemblies direct the film downwardly into each respective tank, upwardly through each tank, and between tanks in a manner to introduce the film into the next adjacent tank. Following completion of the developing operations, the film is directed from the automatic processing equipment by a film delivery system for drying in a dryer chamber and then for delivery of the finished product in a conventional manner. Prior to exiting from the equipment, it is necessary to carefully dry the film to prevent damage to the emulsion. In this regard, various types of blowers, baffles and more or less complicated air directional apparatus have been employed to guide the air currents to impinge upon the film surface for optimum overall drying operations. All of the prior art dryer systems of which we are familiar are quite costly in construction and expensive in maintenance, thereby adding to the overall initial cost of the machine and to the operating costs after installation.

Additionally, the presently available dryers have proved deficient in removing droplets of moisture which remain upon the film surface after the film is directed through the wash tank. Most film is fabricated of acetate, polyester or other plastic based emulsion which is characterized by the presence of extremely high surface tension. Due to this surface tension, liquid remains upon the film surface in the form of small, round droplets which prior works in the art have found extremely difficult to remove. Some workers have tried to blow the droplets off of the plastic film sheet. Such procedures have proved unsatisfactory in that the dryer section fan pressure forces blow the droplets over the film surface in a manner which tends to leave a track on the emulsion surface, thereby actually creating a change in the emulsion surface and resulting in a deficient final product. Other prior workers in the art have attempted to solve the surface tension problem by placing a wetting agent in the fixative tank in an attempt to break down the surface tension. To date, the addition of the wetting agent has not significantly reduced the surface tension to a level satisfactory to eliminate the moisture droplet problem.

SUMMARY OF THE INVENTION

The present invention relates generally to automatic x-ray or other film processing equipment, and more particularly, is directed to novel film drying rollers which are capable of automatically drying developed x-ray and other type of film in a rapid inexpensive manner.

The drying rollers of the present invention position in the dryer section of an automatic film developing machine and preferably include a tangentially coacting pair of dryer rollers which receive the fully developed film from the wash tank and act to remove water droplets continuously in a blotting action. The rollers of the present invention act to break down surface tension of water droplets on the emulsion surface and to rapidly absorb all liquids without damage to the emulsion.

The drying rollers of the present invention are fabricated of unique polyvinylchloride plastic which has been suitably treated to contain literally millions interconnected, microscopic pores which render the rollers capable of absorbing relatively great quantities of liquid much in the manner of a blotter by means of capillary action. The developed film is directed through the nip of the drying rollers whereby all droplets of water remaining on the film are directed into contact with the rollers. The remaining moisture is absorbed by the rollers by capillary action without any damage to the emulsion whatsoever. The drying rollers of the present invention are positioned within the usual dryer section of the developing equipment wherein the liquid absorbed by the drying rollers from the film is expelled from the rollers by vaporization due to the heat generated within the dryer section by the usual dryer section heaters and fans.

It is therefore an object of the present invention to provide an improved film dryer system of the type set forth.

It is another object of the present invention to provide novel film drying rollers which incorporate a pair of cooperating, plastic rollers which have been treated to contain literally millions of interconnecting, microscopic pores.

It is another object of the present invention to provide novel film drying rollers containing moisture absorption means which act to continuously absorb liquid from a film surface without damage to the film emulsion.

It is another object of the present invention to provide novel film drying rollers which are fabricated of polyvinylchloride plastic which has been specially treated to contain millions of microscopic, interconnected pores which act to break down the surface tension upon a developed film and to absorb all moisture contained on the film surface.

It is another object of the present invention to provide a film drying system comprising novel film drying rollers which are capable of absorbing moisture from a film surface by means of capillary action and including heat generating means sufficient to vaporize the moisture absorbed by the rollers.

It is another object of the present invention to provide novel film drying rollers that are rugged in construction, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
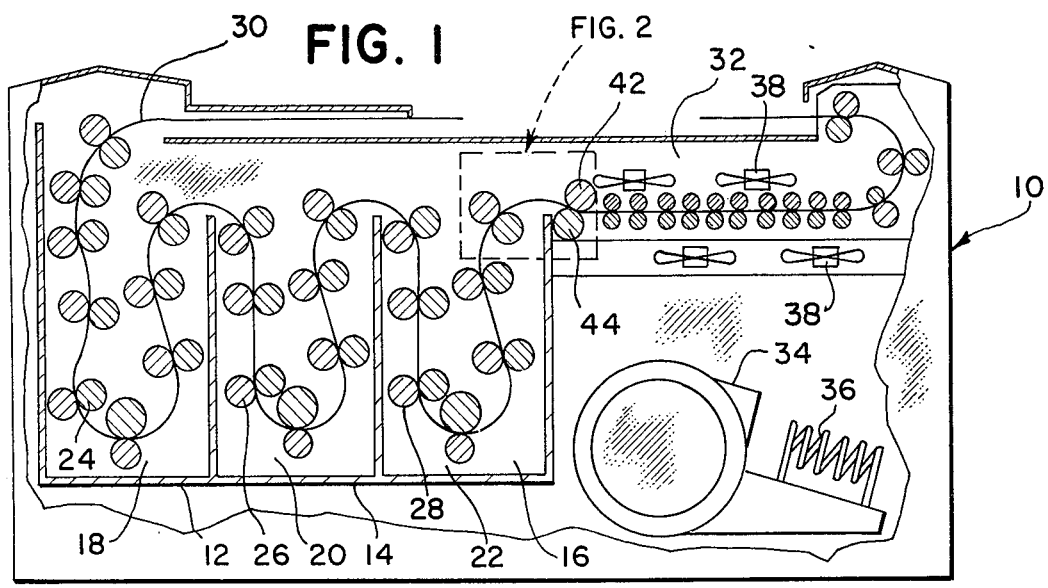
FIG. 1 is a side elevational view of an automatic film developing apparatus incorporating the drying rollers of the present invention, portions of the apparatus having been broken away to expose details of interior construction.

Although specific terms are used in the following description for the sake of clarity, these terms are intended to refer only to the particular structure of our invention selected for illustration in the drawings and are not intended to define or limit the scope of the invention.

Referring now to the drawings, we show in FIG. 1 an x-ray film developing machine 10 of conventional design and including three juxtaposed liquid containing tanks 12, 14, 16 for containing respectively the usual developer solution 18, fixing bath 20 and wash solution 22. Each of the tanks 12, 14, 16 is provided with a conventional rack assembly 24, 26, 28 which is comprised of suitable rollers and guides of well known design to lead the film 30 automatically through the various tanks 12, 14, 16 for the usual film developing procedures. Following the film developing operations, the film 30 is automatically directed into a drying chamber 32 wherein a conventional fan 34 and heater 36 cooperate to provide sufficient heated air for film drying purposes. If desired, additional circulating fans 38 may be employed to increase air turbulence to aid in the film drying process.

Figure 2:
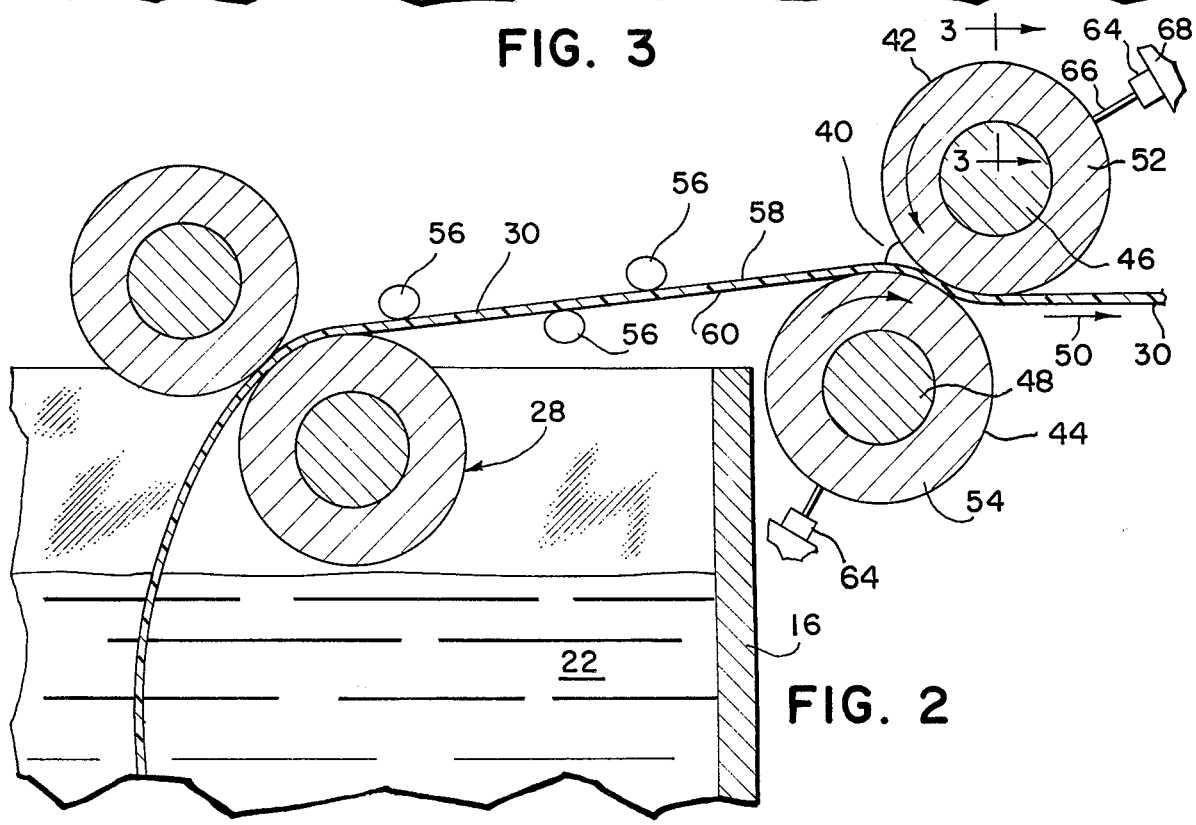
FIG. 2 is a fragmentary, enlarged view of the area of FIG. 1 enclosed within the dotted lines, showing the drying rollers of the present invention.

As best seen in FIGS. 1 and 2, the film 30 is directed out of the wash tank 16 by the rack assembly 28 and, by the operation of suitable guides (not shown), is then directed to the nip 40 which is defined between the tangentially contacting drying means in the form of rollers 42, 44. It will be noted that the drying rollers are mounted within the drying chamber 32 to thereby be continuously exposed to the drying action of the main dryer fan 34, the heater 36 and the upper and lower tiers of circulating fans 38.

Figure 3:
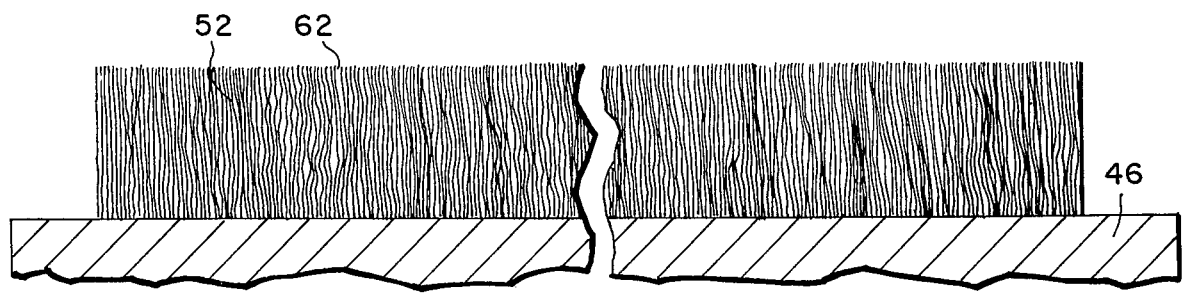
FIG. 3 is an enlarged, cross sectional view taken along line 3—3 of FIG. 2, looking in the direction of the arrows.

Referring now to FIGS. 2 and 3, it will be seen that each of the drying rollers 42, 44 is fabricated to include a conventional shaft 46, 48 which is suitably journaled within the drying chamber 32 to conventionally rotate the rollers 42, 44 as necessary to facilitate passage of the film 30 in the direction of the arrow 50. A resilient specially fabricated polyvinylchloride roll 52, 54 having unusual moisture absorbing qualities is conventionally affixed to each respective shaft 46, 48 in a manner to absorb the droplets 56 of moisture which conventionally adhere to the upper and lower film surfaces 58, 60 as the film 30 is directed out of the wash solution 22 by means of the wash tank rack assembly 28. It is the essence of this invention that the PVC rolls 52, 54 be fabricated of plastic which is treated to provide suitable properties to render the rolls capable of absorbing all of the moisture droplets 56 which remain on the film surfaces 58, 60 as the film 30 passes through the nip 40 which is defined between the upper and lower drying rollers 42, 44.

Each roll 52, 54 is fabricated of specially treated, resilient, polyvinylchloride plastic material having a hardness, if compared to a Shore A scale of approximately 12 to 25 durometer. The material is suitably fabricated by those skilled in the art to a micro-porous configuration having literally millions of microscopic pores 62 per square inch. One such product which has proved suitable for use in the present invention is the micro-porous plastic material manufactured by S. C. Johnson & Son, Inc., Racine, Wisconsin under the trademark "Porelon". The polyvinylchloride material contemplated for use with the present invention is fully described in U.S. Pat. No. 2,777,824.

All prior workers have conventionally employed the "Porelon" PVC plastic material for use with ink rollers and ink pads wherein the rollers and pads were initially ink impregnated to provide a locked-in ink supply. Such prior art ink impregnated micro-porous plastic rollers and pads have usually been designated as "dry ink systems" or as "solid ink" systems. Surprisingly, it has been found that by employing only the microporous plastic rolls 52, 54, without ink impregnation, the micro-pores 62 exhibit great thirst or moisture absorbing qualities and act to quickly and continuously remove the droplets 56 from the film surfaces 58, 60 as the film 30 passes between the drying rollers 42, 44. As previously stated, the drying rollers 42, 44 position within the usual machine drying chamber 32 and are thereby continuously exposed to the drying atmosphere created by means of the dryer chamber fan 34, the heater 36 and the tiers of circulating fans 38. Thus, continuous rotation of the drying rollers 42, 44, about their respective roller shafts 46, 48 within the drying chamber 32 tends to continuously remove the moisture which had been absorbed by the micro-porous PVC rolls 52, 54. Accordingly, because of the drying action of the drying chamber 32 equipment, the micro-porous rolls 52, 54 are subject to continuous drying forces which act to prevent moisture saturation of the rolls. Thus, the drying rollers 42, 44 are capable of substantially continuous operation to absorb the moisture droplets 56 which may cling to the film 30 as it exits from the wash solution 22.

Due to the cellular nature of the plastic rolls 52, 54, the micro-pores of the plastic material are capable of continuously absorbing moisture droplets 56 by capillary action as the film web enters the drying chamber 32. In addition to the drying action of the drying chamber 32, it has been found that due to the micro-porous construction, the PVC rolls 52, 54 have infinite ability to absorb moisture and to release the moisture under pressure. Accordingly, if desired, pressure means 64 which may be in the form of a conventional doctor blade 66 which is held in contact with the rollers 42, 44 may be employed for moisture release purposes. The doctor blades 66 may be conventionally affixed to portions of fixed construction 68 to continuously apply pressure to the outer periphery of a plastic roll 52, 54. Thus, due to the continuous drying action of the drying chamber 32, and if required, the pressure means 64, the drying rollers 62, 64 can function continuously to dry the film surfaces 58, 60 during all periods of film travel within the drying chamber 32.

Although we have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

We claim:

1. The method for removing moisture droplets from the upper and lower surfaces of a photographic plastic film characterized by an emulsion surface of high surface tension, as the wet film carrying the moisture droplets exits from processing equipment including at least one liquid bath and travels in a drying chamber between and in contact with a pair of drying rollers, the improvement which consists in
    absorbing the moisture droplets by capillary action into microporous plastic material of at least a million interconnected microscopic pores per square inch covering the rollers, and
    removing the dried film from contact with the rollers of the drying apparatus without leaving a droplet track on or marring the emulsion surface.

2. The method of claim 1 wherein the absorbing step is carried out while the microporous plastic material contains liquid.

3. The method of claim 2 wherein the absorbing step is carried out while the microporous plastic material contains an increasing volume of liquid.

4. The method of claim 1 wherein moisture is removed from both surfaces without leaving a droplet tract on or marring either surface.

5. The method of claim 1 which comprises removing the droplets from both film surfaces.

6. The method of claim 1 which comprises removing the droplets without spreading them as a film on the emulsion surface and thus absorbing them without marring the emulsion surface.

7. The method of claim 1 wherein the absorbing step is performed while there is no positive pressure applied onto the film surface by the contacting rollers.

8. In a drying system for photographic film having an emulsion covered surface having high surface tension with droplets of liquid on each surface, the system having at least one drying roller in contact with each surface of the wet film, the rollers defining a nip therebetween, the improvement which consists of
    the droplet carrying film positioned upstream relative to the roller to contact the microporous surface of at least one of the drying rollers,
    at least one roller surface of microporous plastic material having at least millions of interconnected microscopic pores per square inch and having capillary action in contact with the film surface, and
    a droplet free film positioned downstream relative to the roller, the film surface being dry and free of marring or marks on the emulsion surface.

9. The drying system of claim 8, wherein the microporous plastic material of the roller contains liquid absorbed from the film.

10. The drying system of claim 8, wherein both surfaces of the film downstream of the rollers are free of marring or marks on the emulsion surface.

11. The drying system of claim 8, which comprises air blowing and drying means.

12. The system of claim 8 wherein the pairs of rollers are in contact with the droplets of liquid while absorbing them without pressure application onto the emulsion.

13. In a drying system for photographic film with droplets of liquid on each surface having one drying roller in contact with each surface of the film and the rollers defining a nip therebetween, wherein the film surface includes an emulsion surface having high surface tension, the improvement which comprises
    at least one roller of microporous plastic material of at least millions of interconnected microscopic pores per square inch and having capillary action to absorb the liquid droplets,
    another roller positioned to rotate in cooperation with the first roller and to carry the film inbetween, the
    means to break down the surface tension to remove the liquid droplets on the film surface without damage to the emulsion.

* * * * *